3,281,405
CATALYST AND PROCESS FOR POLYMERIZING ETHYLENE
John P. Hogan, Bartlesville, Okla., assignor to Phillips Petroleum Company, a corporation of Delaware
No Drawing. Filed Oct. 5, 1964, Ser. No. 401,646
5 Claims. (Cl. 260—94.9)

This application is a continuation in part of application Serial No. 148,053, filed October 27, 1961, now abandoned.

This invention relates to a novel method for the activation of a chromium oxide-containing catalyst. More particularly, it relates to a two-stage treatment for the activation of a chromium oxide catalyst. In one aspect, this invention relates to the formation of an improved catalyst by a two-stage activation of same. In another aspect it relates to a process for polymerizing an olefin in the presence of a catalyst activated by a two-stage process, increasing the productivity of the catalyst while maintaining satisfactory polymer melt index by utilizing an improved activated chromium oxide catalyst.

It is known that increasing the temperature of the air activation of a supported chromium oxide catalyst provides a catalyst which, when used in the polymerization of ethylene, yields polymers having a lower molecular weight as indicated by a higher melt index for that polymer. Hogan et al., in U.S. Patent 2,825,721, teach that air activating a supported chromium oxide catalyst at the relatively high temperature range of 1300–1500° F. will tend to modify resulting polymers in this fashion. This technique may be used to advantage in the preparation of a catalyst for a polymerization system which inherently tends to produce ethylene polymers of a higher molecular weight than is desired. The particle form ethylene polymerization system (reaction in a non-solvent below the softening point of the polymer), though an economically attractive system, tends to produce a polyethylene which has a relatively high molecular weight which is therefore not suitable for certain applications.

It has recently been found that the substiution of a finely divided non-porous silica for the porous silica gel generally used as the chromium oxide support will increase the maximum activation temperature the catalyst can endure before its structure becomes degenerated and useless for polymerization. These still higher activation temperatures (1500 to 2200° F. have been proposed) have in turn, resulted in a further reduction in the molecular weight of particle form polyethylene. Polymer melt indices (high load) of about 5 or greater have been obtained indicating the material is satisfactory for a large number of applications.

It has been observed that as supported chromium oxide catalysts are activated at increasingly higher temperatures, the polymers of ethylene produced in their presence have correspondingly decreased molecular weight and increased melt index, but the polymerization rate is simultaneously decreased.

However, I have now found a method for treating a supported catalyst in such a way as to obtain the benefits of high-temperature activation while substantially reducing the disadvantages thereof. Supported chromium oxide catalyst can be activated in a two-stage treatment so as to give increased productivity while maintaining a satisfactory melt index. More particularly, I have found that a chromium oxide catalyst supported on non-porous silica and subjected to a two-stage air activation comprising a high-temperature treatment carried out at about 1500–2000° F. followed by a treatment at a low temperature of about 800–1500° F. with a temperature differential in the range of 300° to 1200° F. between the high-temperature treatment and the low-temperature treatment will give increased yields of polymer having an acceptable melt index.

It is an object of this invention to provide an improved catalyst for polymerization. Another object of this invention is to provide a novel method for preparing an improved catalyst. Another object is to provide a method for increasing polymer yield while obtaining an acceptable melt index. A further object is to provide a method wherein a chromium oxide-containing catalyst is activated so as to produce increased amounts of polymer having a satisfactory melt index.

Other objects, aspects and the several advantages of the invention are apparent from a study of the disclosure and the appended claims.

In accordance with this invention, chromium oxide catalysts on a support are activated by a two-stage air activation comprising a high stage at a temperature in the range of 1500° to 2000° F. and a low stage of 8000° to 1500° F., with a temperature differential in the range of 300° to 1200° F., for example about 500° F., between the high stage and the low stage. This two-stage activation allows for higher activation temperature of catalyst which in turn, when used in the polymerization process, results in increased productivity of the polymer while still obtaining a satisfactory melt index.

The following examples are presented as illustrative of the invention.

EXAMPLE I

A 50 g. quantity of non-porous silica having a particle size of about 0.015 to 0.020 micron, a specific gravity of 2.1 and a refractive index of 1.55 was contacted with a 150 ml. aqueous solution containing 0.9804 g. chromic anhydride followed by drying to a temperature of about 300° F. for about 1 hour. The solid catalyst was then crushed to pass through an 80-mesh screen. The catalytic mass was then subjected to an air activation for 5 hours at 1832° F. followed immediately by an activation at 1000° F. for another 15 hours, also in air. After the activation treatment the catalyst, which was found to contain 1.0 percent chromium, was maintained under a dried air atmosphere until used.

A 0.0589 g. quantity of the above prepared catalyst was charged into a 1300 ml. chromium-plated carbon steel reactor equipped with a stirrer together with 340 g. n-pentane. The reactor was then sealed, warmed to 210° F., and ethylene was admitted to maintain a pressure of 450 p.s.i.g. After a total reaction period of 80 minutes, the reactor was opened and all the volatile components were evaporated. A yield of 118.1 g. polymer, or a productivity of 1500 g. polymer per g. catalyst per hour, was obtained. The high load melt index of the product was 6.3.

EXAMPLE II

This example is a control run showing the effect of omitting the second stage of the catalyst activation.

A portion of the chromium oxide coated non-porous silica was activated for a total of 15 hours at 1832° F.

A 0.0788 g. portion of the above prepared and activated catalyst was used in a 70-minute ethylene polymerization reaction which was otherwise essentially identical to Example I. The run yielded 95.5 g. polymer which exhibited a melt index (high load) of 11.4. The indicated productivity was 1038 g. polymer per g. catalyst per hour.

A summary of the essential data of these examples may be seen in Table I below:

*Table I*

| Ex. No. | Air Activ'n. of Catalyst, Hrs. | | Polymerization | | Polymer Melt Index [1] |
|---|---|---|---|---|---|
| | 1,832° F. | 1,004° F. | Catlayst Used, g. | Rate, g./g./hr. | |
| 1 | 5 | 15 | 0.0589 | 1,500 | 6.3 |
| 2 | 15 | 0 | 0.0788 | 1,038 | 11.4 |

[1] ASTM D 1238 (high load).

Thus, the data show that the two-stage activation treatment (Example I) increases the productivity while still retaining a satisfactory polymer melt index.

The two-stage air activation treatment comprises heating of the supported chromium oxide composite for 1 to 50 hours, preferably 2 to 20 hours, at 1500–2000° F., preferably 1700–1900° F., followed by heating at 800–1500° F., preferably 900–1100° F., for 1 to 50 hours, preferably 2 to 20 hours. The heating may be carried out under oxidizing conditions in any form of conventional equipment known in the art, but it is preferred to use a heated quartz tube through which a stream of air passes. A time lapse may occur between the two stages of the treatment, but it is preferred to carry out the two heating treatments consecutively merely by adjusting the temperature downwards after the first stage heating is completed.

This invention is applicable to the preparation of catalysts used in polymerization and copolymerization of $C_2$–$C_8$ olefins as taught by the Hogan et al. patent, U.S. 2,951,816. It is particularly applicable to the catalysts used in the polymerization of ethylene, and more particularly to the catalysts used in the polymerization of ethylene under particle form conditions.

While non-porous silica is a preferred support for use in this invention, other suitable supports include oxides such as silica, alumina, zirconia and thoria, or combinations of these. Of particular value are oxides prepared in such a way as to exhibit a purity greater than 99 percent, an extreme particle fineness (about 0.02 micron) and an essentially non-porous form. The chromium may be incorporated onto the support by any method taught in the aforementioned Hogan et al. patent. For example, an aqueous solution of chromium oxide, or of a water-soluble chromium-containing compound which is convertible to that oxide on calcination, can be used. Alternatively, the chromium oxide can be blended into the support by simple dry mixing. The amount of chromium impregnated into the support will range from about 0.01 to about 50 weight percent calculated as the metal.

Although the support used for the preparation of the composite catalyst is originally in a very finely divided state, the chromium incorporation stage may cause agglomeration of the composite to some extent. It is preferred, therefore, to reduce the particle size to at least a No. 40 U.S. mesh size before activation and contact with the olefin.

While air has been illustrated as the activating medium, any oxygen-containing gas may be employed.

While the temperature ranges of the two-stage treatment are shown to be a first stage of 1500 to 2000° F. and a second stage of 800 to 1500° F., it is desired that a temperature differential in the range of 300° to 1200° F. be maintained between the two heating stages. The preferred temperatures are 1700 to 1900° F. and 900 to 1100° F. for the two stages, respectively.

The diluents include paraffins having from 3 to 12, preferably 5 to 12, and more preferably 4 to 8 carbon atoms per molecule. Any hydrocarbon diluent which is relatively inert, non-deleterious, and liquid under the reaction conditions of the process can be used. Diluents that have been used successfully for the polymerization of ethylene, propylene and other olefins according to this invention include propane, isobutane, normal butane, normal pentane, isopentane, isooctane (2,2,4-trimethylypentane), cyclohexane, and methylcyclohexane. Normal hexane, the isohexanes such as neohexane and diisopropyl, normal octane, normal nonane, the isononanes, cyclopentane, methylcyclopentane, the dimethylcyclopentanes, and the dimethylcyclohexanes, can also be used. Methane and/or ethane can be used, especially where gas-phase contacting is practiced, and for liquid-phase contacting they can be used in admixture with the heavier hydrocarbons mentioned. The heavier paraffinic diluents have a higher solvent power for the product polymer than do the lighter ones. However, the lighter paraffins are quite useful in my process. Aromatic hydrocarbon diluents are operative, although less preferred in many cases.

The polymerization can be effected with a fixed-bed catalyst or with a mobile catalyst. A frequently preferred method of conducting the polymerization reaction comprises contacting the feed olefin with a slurry of the comminuted chromium oxide catalyst in suspension in the solvent or diluent. From about 0.01 to 10 weight percent of catalyst, based on weight of diluent, is ordinarily used. The catalyst can be maintained in suspension by a mechanical agitating device and/or by virtue of the velocity of the incoming feed or diluent. In this type of operation, a large portion of the product polymer remains associated with the catalyst, which is withdrawn from the reaction zone as a slurry. The polymer can be separated from the catalyst by dissolution in a solvent of the type described, usually with the aid of heat and agitation, and the stripped catalyst can be recycled and/or regenerated. The regeneration can be accomplished by oxidizing the residual carbonaceous deposit with a controlled concentration of oxygen in an inert gas by conventional procedures. However, the productivity of my catalyst is sufficiently high that it is often economical to discard the used catalyst after a single pass through the reactor. In some cases, especially where a pigment such as carbon black is to be added to the polymer product, or where high polymer productivity is obtained, the catalyst need not even be separated from the polymer.

In preparing the catalyst, the presence of at least a part of the chromium in the hexavalent form is essential. It is preferable that at least 0.1 to 10 weight percent of chromium be deposited on the support.

Reasonable variations and modifications are possible within the scope of the foregoing disclosure and the appended claims to the invention, the essence of which is that there has been provided a process for the activation of a chromium oxide catalyst which comprises subjecting the catalyst deposited on a non-porous support to a two-stage activation treatment consisting of a first stage at a temperature of about 1500 to 2000° F. followed by a second stage at a temperature of about 800 to 1500° F., with a temperature differential in the range of 300° to 1200° F. between the high temperature treatment and the low temperature treatment.

I claim:

1. A process for activation of a chromium oxide-containing catalyst wherein at least part of the chromium is present in the hexavalent state which comprises subjecting said catalyst on a non-porous support selected from the group consisting of silica, alumina, zirconia and thoria to a two-stage activation temperature wherein the first stage comprises a high-temperature treatment in the range of about 1500–2000° F. and the second stage comprises a low-temperature treatment in the range of about 800–1500° F., said first and second stages being carried out at such temperatures as to provide a temperature differential in the range of 300° to 1200° F. and wherein both the high-temperature and low-temperature treatments are carried out for a period of time in the range of about 1 to 50 hours.

2. The process of claim 1 wherein the support is a non-porous silica.

3. A process for manufacturing a chromium oxide-containing supported polymerization catalyst which comprises contacting non-porous silica with a solution of chromium compound convertible to oxide upon heating so as to deposit an amount of chromium on said silica in the range of 0.1 to 10 weight percent of the resulting composite, drying the same and calcining said composite in dry air at a first temperature in the range of 1500° to 2000° F. and a second temperature range of 800° to 1500° F. so as to activate said composite and convert said chromium compound to chromium oxide in which at least a portion of the chromium is hexavalent, said calcining being carried out so as to provide a temperature differential in the range of 300° to 1200° F., and wherein said first and second temperatures are maintained for about 2 to 20 hours.

4. A chromium oxide-containing catalyst in which at least a portion of the chromium is hexavalent prepared by contacting a silica support with a solution of chromium compound convertible to oxide upon heating so as to deposit an amount of chromium on said silica in the range of 0.1 to 10 weight percent of the resulting composite, drying the same and heating said composite at a first temperature in the range of about 1500° to 2000° F. and a second temperature range of 800° to 1500° F., said heating being carried out at such temperatures as to provide a temperature differential in the range of 300° to 1200° F., and wherein said first and second temperatures are maintained for a period of about 2 to 20 hours.

5. In a process for the production of a normally solid polymeric hydrocarbon material, the steps which comprise contacting a normally gaseous olefin containing from 2 to 8 carbon atoms with a chromium oxide-containing catalyst in which at least a portion of the chromium is in the hexavalent state prepared by contacting a support with a solution of chromium compound convertible to oxide upon heating so as to deposit an amount of chromium on said support in the range of 0.1 to 10 weight percent of the resulting composite, drying the same and heating said composite at a first temperature in the range of about 1500° to 2000° F. and a second temperature range of 800° to 1500° F. for a period of 2 to 20 hours, said heating being carried out at such temperatures to provide a temperature differential in the range of 300° to 1200° F. and separating a polymeric hydrocarbon material therefrom.

No references cited.

JOSEPH L. SCHOFER, *Primary Examiner.*

F. L. DENSON, *Assistant Examiner.*